United States Patent [19]

Schoon

[11] Patent Number: 4,630,223
[45] Date of Patent: Dec. 16, 1986

[54] SCANNER AMPLITUDE STABILIZATION SYSTEM

[75] Inventor: David J. Schoon, North Branch, Minn.

[73] Assignee: Minnesota Mining and Manufacturing Company, St. Paul, Minn.

[21] Appl. No.: 586,204

[22] Filed: Mar. 5, 1984

[51] Int. Cl.⁴ .................. G01D 15/14; G06K 15/12
[52] U.S. Cl. ................................. 364/518; 364/523; 346/160; 346/108; 350/6.8
[58] Field of Search ............... 364/571, 518, 519, 523, 364/525; 350/6.4, 3.71, 6.6, 6.8; 346/108, 160; 358/302, 208

[56] References Cited

U.S. PATENT DOCUMENTS

| | | | |
|---|---|---|---|
| 3,809,806 | 5/1974 | Walker et al. | 350/6.8 X |
| 4,037,231 | 7/1977 | Broyles et al. | 346/108 |
| 4,160,939 | 7/1979 | Damouth et al. | 350/6.8 X |
| 4,175,851 | 11/1979 | Kitamura et al. | 346/160 X |
| 4,270,131 | 5/1981 | Tompkins et al. | 346/108 |
| 4,306,242 | 12/1981 | Jeffery | 346/108 X |
| 4,340,894 | 7/1982 | Oono et al. | 346/108 |
| 4,414,556 | 11/1983 | Ohno et al. | 346/160 |
| 4,492,970 | 1/1985 | Lee et al. | 346/160 |
| 4,530,064 | 7/1985 | Takigawa et al. | 364/518 X |
| 4,541,061 | 9/1985 | Schoon | 346/108 X |

Primary Examiner—Edward J. Wise
Attorney, Agent, or Firm—Donald M. Sell; James A. Smith; Robert L. Marben

[57] ABSTRACT

Circuitry for controlling the amplitude of a self-resonant scanner including a first means for measuring the time to complete a number of full cycle scanner movements, a second means for measuring the time to complete a number of movements between a first fixed point and a second fixed point in the scan path and logic means using such time measurements to determine whether the scanner amplitude is greater or less than a desired amplitude and providing digital information to produce an analog signal for controlling the scanner amplitude to reduce any difference from the desired amplitude.

8 Claims, 5 Drawing Figures

SCANNER AMPLITUDE STABILIZATION SYSTEM

BACKGROUND OF THE INVENTION

The invention presented herein relates to a system for controlling the amplitude of a self-resonant scanner and, more particularly, for controlling the amplitude of such a scanner when used in a laser beam printer of the type requiring a high degree of scanner amplitude control.

While the movement of a self-resonant scanner is highly reproducible, the degree of precision for the scanner amplitude that is afforded by such a scanner and its drive circuit does not meet the requirements of a laser printer wherein the amplitude of the self-resonant scanner must be within an accuracy of $+/-0.1\%$. Both the scanner and the drive circuit for the scanner will drift in characteristics with temperature so factory adjustment of the scan amplitude will not provide the desired precision. Precision control of the scanner amplitude is needed since it is related to the rate at which data is clocked for on-off control of the laser in a laser printer.

SUMMARY OF THE INVENTION

The present invention provides for precision control of the scanner amplitude of a self-resonant scanner in a manner such that virtually any level of accuracy can be obtained. The system provided by the invention allows the scanner amplitude to be stabilized prior to the time a page is printed by the laser printer.

This invention provides a scanner amplitude stablization system for a self-resonant scanner operated to define a scan path including a first means for measuring the time interval for the scanner to complete a number of full cycle movements; second means for measuring the time interval for the scanner to move a number of times between a first fixed point to a second fixed point in the scan path; logic means connected for receiving and using the time interval measurements from the first and second means for determining whether the scanner operating amplitude differs from the desired amplitude and providing digital information based on any such difference that is usable for the production of an analog signal for controlling the amplitude of the scanner to reduce such difference.

A change in the amplitude of a self-resonant scanner operated at a given frequency will cause a change in the time it takes the scanner to move between from one designated fixed point to another designated fixed point in the scan path. Measurement of only this time interval, however, is not sufficient for use in making a correction of the scanner amplitude as it is desirable that the system work with any of the production scanners for a self-resonant scanner selected for use in an apparatus such as a laser printer. There is a small difference in the frequency of operation between production scanners and a change in frequency of the scanner used will also influence such time interval. It is also possible that the frequency of a given scanner will change slightly. The problem introduced by changes in the frequency of the scanner used with a system provided for stabilization of the amplitude of the scanner is eliminated by the measurement of the first time interval and its use with measurements of the second time interval, that have been mentioned. The use of such measurements to determine whether the scanner is operating at a desired amplitude is based on the duty cycle applicable to the use of the scanner in an apparatus. The duty cycle is the ratio of the number of phase angle degrees the scanner, when operated at a desired amplitude, moves to scan from the first fixed point to the second fixed point in the scan path, as mentioned above, divided by 360.

It is convenient in the implementation of this invention to place a photodetector at each of the two fixed points in the scan path. The output of the photodetectors due to light reflected from the mirror of the scanner as it oscillates can be utilized to time the beginning and end of the time interval to be measured as the scanner oscillates to sequentially provide light to each of the photodetectors. One of the photodetectors can also be used to determine when the scanner has initiated and completed a full cycle of movement.

In one embodiment of a system according to the present invention, the first means for measuring the time interval for the scanner to complete a number of full cycle movements includes a stable clock which has its output pulses counted by a first counter. The output of the first counter is supplied to the logic means, which also receives a signal due to energization of the photodetector used to establish the time for start and finish of a number of full cycle movements of the scanner. The output of such photodetector thus allows the first counter output to be related by the logic means to the full cycle movements of the scanner. The second means for measuring the time interval for the scanner to move a number of times from a first to a fixed point to a second fixed point in the scan path includes a second counter. The second counter receives pulses from the stable clock via a gate circuit which is operative to supply pulses from the stable clock to the second counter during the time interval between an output from the first photodetector for the first fixed point in the scan path and the output from the second photodetector for the second fixed point in the scan path signaling the movement of the scanner to the second fixed point. It is also possible to measure the time interval for the scanner to move between two fixed points in the scan path by using the second counter to measure the time interval between an output received from the second photodetector and the first photodetector, indicated above.

The logic means required by the system can take the form of a microprocessor particularly when such system is used as a part of a laser printer wherein at least one microprocessor is normally available and would be available for use prior to the imaging of a page to be printed by the printer thus maximizing the usage of a microprocessor used in the laser printer. It is expected that any application of the system of this invention will occur in situations where a microprocessor is used. A microprocessor makes it possible to use a number of algorithms for determining whether the measured time intervals indicate a need to correct the scanner amplitude so the desired duty cycle that has been defined can be attained.

BRIEF DESCRIPTION OF THE DRAWINGS

A better understanding of this invention, including its novel features and advantages, will be obtained upon consideration of the following detailed description and accompanying drawings wherein.

DETAILED DESCRIPTION

Figure 1:
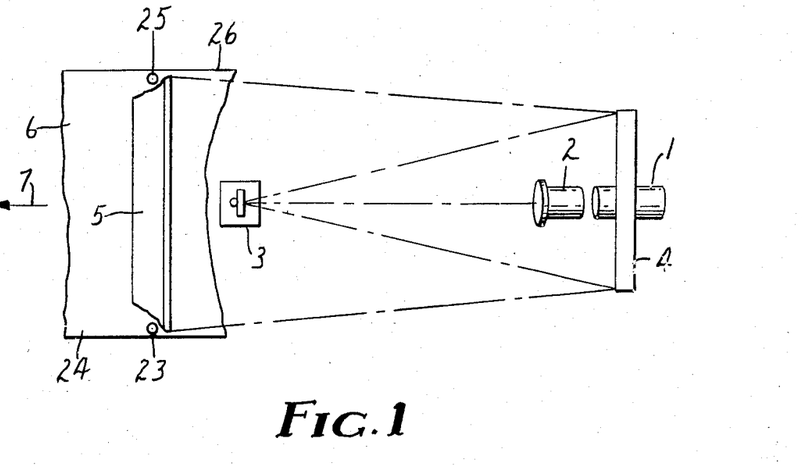
FIG. 1 is a plan view in schematic form illustrating the scanning portion of a laser printer apparatus.
Figure 2:
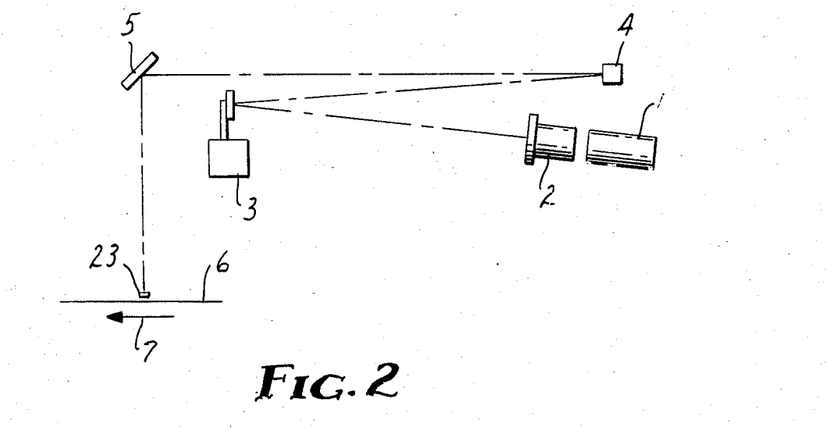
FIG. 2 is a side view of the scanning portion of a laser printer apparatus shown in FIG. 1.

The present invention will be described in connection with its use in a laser printer apparatus. Referring to FIG. 1 of the drawings, a plan view is shown illustrating the scanning portion of a laser printer which includes a laser 1, which can be a laser diode type, a lens system 2, a self-resonant scanner 3, which has a mirror, mirrors 4 and 5 and a photoconductor element 6. Such elements are also shown in FIG. 2 which is a side view of the apparatus of FIG. 1. The photoconductor 6 is only partially shown. It is understood, however, that it can take the form of a belt, drum or flexible sheet.

Light from the laser 1 is focused by the lens system 2 onto the mirror of the self-resonant scanner which oscillates to direct the light to mirror 4 causing the light to move as a scan lengthwise of mirror 4. The light presented to mirror 4 is reflected to mirror 5 which is positioned to direct such light to the photoconductor 6 to provide a line scan or scan path at the photoconductor 6. The photoconductor 6 is moved transversely of the light scan that is provided so a line-by-line scan is provided at the photoconductor 6. Movement of the photoconductor 6 is indicated by the arrow 7.

A start of scan line signal (SOS) is required by the laser apparatus which serves to establish the position of the self-resonant scanner at a first fixed point during the start of a scan line relative to the surface to be scanned by the laser output so that certain laser printer operations can be initiated. Similarly, an end of scan line signal (EOS) is needed when a second fixed point in a scan is reached that is indicative of the completion of a forward line scan which is usable for additional control purposes. The manner in which such start of scan and end of scan signals are produced is not important except to the extent that the start of scan signal must be provided at the same point for each scan line. One convenient way for providing the start of scan line signal and the end of scan line signal is illustrated in FIG. 1. A light-to-electric transducer 23 is positioned just above and a short distance, about 1.3 centimeters, for example, inside the start of line scan edge 24 of the photoconductor 6 and in line with the scan line so as to receive light from laser 1 via mirror 5 when light from laser 1 is provided at the self-resonant scanner 3 begins a writing or scanning movement. When light is thus provided to the light-to-electric transducer 23, a start of scan signal is produced. Similarly, a light-to-electric transducer 25 is positioned just above the photoconductor 6 and a short distance, about 1.3 centimeters, for example, inside the end of line scan edge 26 of the photoconductor 6 and in line with the scan line so as to receive light from laser 1 via mirror 5 when light from laser 1 is provided as the self-resonant scanner 3 nears the end of a writing or scanning movement. When light is thus provided to the transducer 25, an end of scan line signal is produced. Return movement of the self-resonant scanner 3 is not used as a writing or scanning movement so the laser 1 is arranged to be held off during such return movement by suitable circuitry (not shown). The light-to-electric transducers 23 and 25 can be photodetector devices which are readily available. A small photodetector is used which, with the sharp light beam from the laser 1, causes the end of scan line and start of scan line signals to precisely occur at the same point in one scan line to the next. The laser 1 is turned off during the return movement of the scanner 3 so no output is produced by the photodetectors 23 and 25 during such return movement.

Self-resonant scanners cannot be manufactured to operate at precisely the same frequency and some variation in the frequency of an installed scanner 3 will occur. In addition, the amplitude of movement of the scanner 3 will also vary due to a drift in the characteristics of the scanner 3 and the drive circuit for the scanner due to temperature. Due to such changes the time that it takes the scanner to travel between the two fixed points in the scan path, such as the photocells 23 and 25 will not be constant. This problem is minimized to the degree it is possible to stabilize the amplitude of operation of the scanner 3. The present invention provides a system that can provide virtually any required accuracy for the scanner amplitude.

Using the duty cycle that is the ratio of the number of phase angle degrees the scanner 3, when operated at a desired amplitude, moves to scan from a first fixed point to a second fixed point in the scan path, divided by 360, the invention provides for the measurement of the actual time interval used by the scanner to travel between such fixed points as well as for a full cycle for use by logic circuitry for determining whether such interval measurements indicate the operating duty cycle differs from the desired cycle, i.e., is the scanner operating amplitude different from the desired amplitude and providing for a change in the control signal to the drive circuit for the scanner 3 to increase or decrease the amplitude of scanner 3 as required to attain the desired amplitude. The level of accuracy attained by this arrangement is increased by measuring the time interval for the scanner to complete a number of full cycle movements and measuring the time interval for the scanner to move a number of times between two fixed points in the scan path. By measuring a large number of such time intervals, statistical errors are minimized and the scanner has time to equilibrate to its new amplitude after a change has been made.

Figure 3:
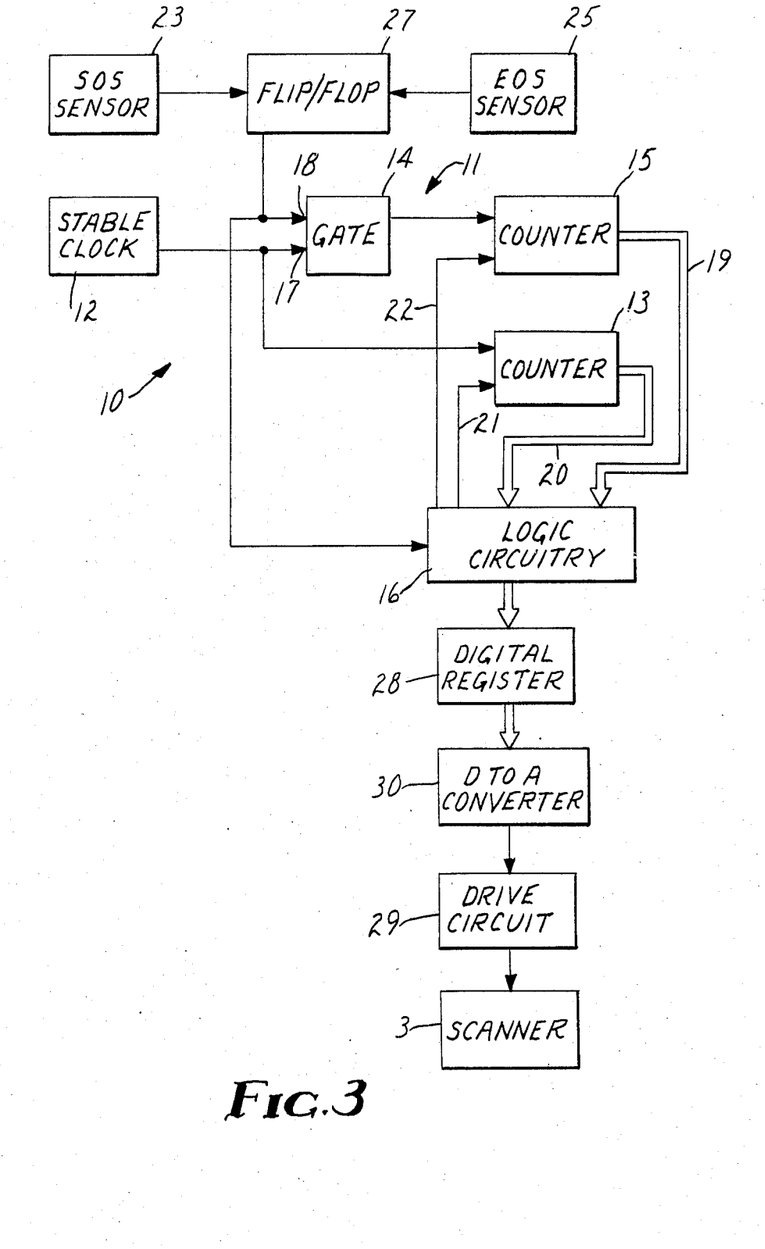
FIG. 3 is an electrical block diagram of circuitry embodying the invention which is usable with the scanning portion of a laser printer as illustrated in FIGS. 1 and 2.

Referring to FIG. 3, a circuit in block diagram form is shown which embodies the invention and includes a first means, indicated generally at 10, for measuring the time interval for the scanner 3 (FIG. 1) to complete a number of full cycle movements, a second means, indicated generally at 11, for measuring the time interval for the scanner to move a number of times between a first fixed point to a second fixed point in the scan path and a logic means 16 which receives the time intervals provided by the first and second means which the logic means uses to determine whether the operating amplitude of the scanner differs from a desired amplitude and provides digital information at its output that is based on any such difference and is usable for the production of an analog signal for controlling the amplitude of the scanner 3 to reduce any such difference.

More specifically, the first means 10, includes a stable clock 12 and a counter 13, while the second means 11, includes a gate circuit 14 and a counter 15. The logic means is logic circuitry 16, which preferably can be a microprocessor. One or more microprocessors would normally be used with a laser printer or any other apparatus using the invention which would be available for use to provide the logic circuitry 16 of this invention. The stable clock 12 provides pulses to counter 13 and to one input 17 of gate circuit 14. The second input 18 of gate circuit 14 is used to receive a signal which indicates when the two fixed points along the scan path defined by the scanner 3 are reached. In the case of the specific circuitry shown in FIG. 3, such circuitry provides a signal to the input 18 of gate circuit 14 which allow the pulses from stable clock 12 to pass to the counter 15 when the start of scan signal (SOS) is provided by photodetector 23 when it receives light from the laser 1 via the scanner 3. Such signal is not removed until the end of scan signal (EOS) is provided by photodetector 25 when it is energized by light from the laser 1 via the scanner 3. Accordingly, counter 15 will count and there provide a measure of time for the scan to move from a first fixed point (photodetector 23) to a second fixed point (photodetector 25). The logic circuitry 16 is also connected to receive the same signals that are received by the second input 18 of gate circuit 14 so the logic circuit 16 is made aware of when pulses from the clock 12 are received by the counter 15. The output of counter 15 is monitored by the logic circuit 16 via the multi-line connection indicated at 19. Similarly, the output of counter 13 is monitored by the logic circuit 16 via the multi-line connection indicated at 20. Since the logic circuit 16 receives a signal indicative of each SOS signal provided by photodetector 23, the logic circuit can monitor the number of full cycle movement completed by the scanner 3 following the receipt of an SOS signal and can read the output of counter 13 when a desired number of full cycles of the scanner 3 have been completed. In addition, since the logic circuit 16 also receives an indication of each EOS signal provided by photodetector 25, the logic circuit 16 can monitor the number of times the time interval from the first fixed point to the second fixed point has been measured by the counter 15 and can read the output of counter 15 when the desired number of such intervals has been measured. A provision is made via connectors 21 and 22 between the logic circuit 16 and the counters 13 and 15, respectively, for clearing counters 13 and 15 by the logic 16.

Since it is necessary that the signal provided to the input 18 of gate circuit 14, when the SOS signal occurs, remain after the scanner proceeds beyond the first fixed point provided by the photodetector 23 so pulses are supplied to counter 15 until such time as the second fixed point provided by photodetector 25 is reached, the output of the SOS sensor, i.e. photodetector 23, is applied to the set input of the flip-flop circuit 27. The EOS sensor, i.e. photodetector 25, is connected to the reset input of flip-flop 27 to reset the flip-flop when the second fixed point provided by the photodetector 25 in the scan path is reached. When the flip-flop circuit 27 is reset, the signal to the input 18 of gate circuit 14 is changed so gate circuit 14 cannot pass pulses from the clock 12 to the counter 15.

In order that a full disclosure is provided for the practice of the invention, a preferred algorithm will be described that is usable by those of ordinary skill in the art to construct a suitable logic circuit 16 or program a microprocessor for use as the logic circuit 16. As has been mentioned, a scanner used in an apparatus will have a duty cycle that is a ratio of the number of phase angle degrees the scanner, when operated at a desired amplitude, moves to scan from the first fixed point to the second fixed point in the scan path divided by 360. It was also indicated earlier that it is desirable to measure a large number of the time intervals that have been discussed to minimize statistical errors and provide the scanner with time to equilibrate to its new amplitude after a change has been made. In order to simplify the operation to be carried out by the microprocessor, it is desirable, as will be seen, to have the duty cycle established such that it is the ratio of two integers such as 36/100, for example.

The count that is obtained by counter 15 for a full cycle of movement of the scanner 3 will thus be 0.36 of the count obtained by counter 13 if the scanner is operating at the desired amplitude. Since a large number of measurements of the two time intervals are desired it can be seen that a count by counter 13 of 36 full cycles of movement of scanner 3 should equal the count obtained from counter 15 for 100 full cycles, if the scanner is operated at the desired amplitude. In more general terms, if the scanner is operated at the proper amplitude the count by counter 13 for N of full cycles will equal the count obtained by counter 15 for (N+M) full cycles or N/(N+M)=duty cycle. For the example given above, N=36 and M=64. Other values for N and M for a duty cycle of 0.36 can be obtained by multiplying or dividing N and M by a whole number to have the relationship satisfied. If A is the count obtained for N full cycles by counter 13 and B is the count obtained by counter 15 for N+M full cycles, it is merely necessary that the logic circuitry 16 compare A and B to determine if the scan amplitude should be corrected. If A>B, the scan amplitude is too high and if A<B, the scan amplitude is too low. Using this information the drive circuit for scanner 3 can be provided with a signal to reduce or increase the amplitude of scanner 3 as required by the comparison made.

The circuitry of FIG. 3 includes a digital register 28 connected to the logic circuit 16 which determines the digital value for the signal applied to the drive circuit 29 for the scanner 3. The output of the digital register is applied to a digital to analog converter 30 which in turn is connected to the drive circuit 29 to provide an analog signal to the drive circuit 29 in accordance with the contents of the digital register 28.

Based on the foregoing, an algorithm is set forth below which can be used to program a microprocessor to provide the logic circuitry 16. As has been already described, counter 13 is free running and counter 15 counts pulses from start of scan (SOS) to end of scan (EOS). The following is also based on the SOS signal being an interrupt to a microprocessor.

Wait for an SOS signal.
Clear counters 13 and 15.
Wait for N SOS pulses.
Note count in counter 13. This is count A.
Wait for "M" additional SOS pulses.
Note count in counter 15. This is count B.
Compare A to B:
If A>B, scan amplitude is too high. Note contents of digital register 28 which is determinative of the current scanner amplitude and decrement the contents by one.
If A<B, the scan amplitude is too low. Note contents of digital register 28 and increment the contents by one.
Look back over past cycles to determine whether decision was to increment or decrement the count in digital register 28. If decision was to alternate—increment, decrement, increment, then discontinue the amplitude adjustment process. If alternate decisions were not made, then return to beginning of this outline, i.e., wait for SOS signal.

Figure 4:
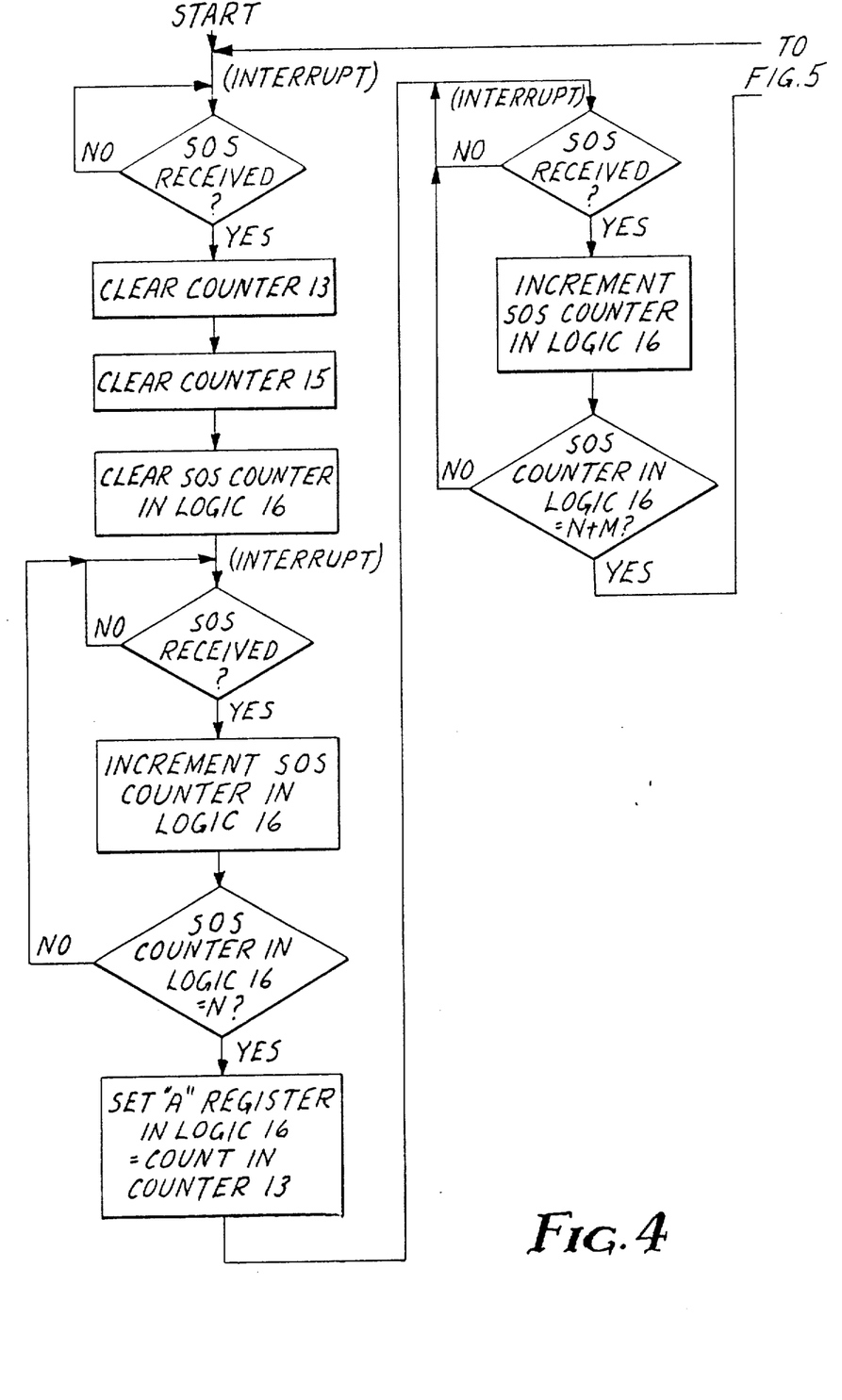
FIGS. 4 and 5 are flow diagrams relating to the logic circuitry shown in FIG. 3.
Figure 5:
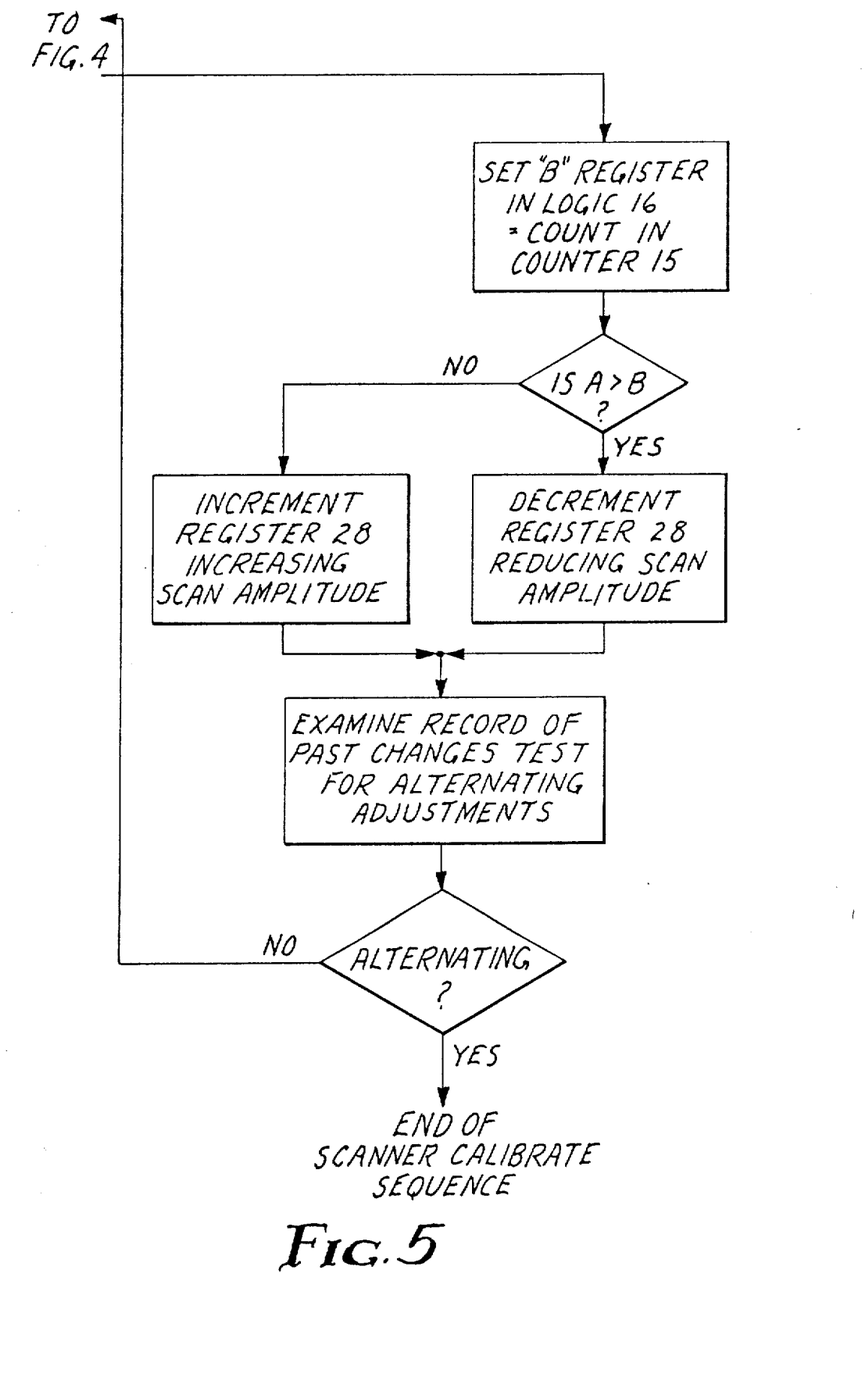

Referring to FIGS. 4 and 5, a flow diagram is provided which expresses the algorithm discussed above.

It should be appreciated that the EOS signal could have been used to generate the interrupt. In addition, counter 15 could be arranged to count from EOS to SOS in each full cycle rather than from SOS to EOS as has been set forth above. In such case the ratio of N/(N+M) would be equal to 1 minus the duty cycle so that the count A by counter 13 for N full cycles will equal the count B obtained by counter 15 for (N+M) full cycles for a desired amplitude. In such case a finding that A was greater than B would be an indication that the actual scan amplitude is too low. It will also be appreciated by those skilled in the art that other algorithms could be used. For example, the counters 13 and 15 could be arranged to count for the same number of cycles with the ratio of the count by counter 13 to the count by counter 15 computed and compared with the desired duty cycle. If the computed ratio is less than the desired duty cycle, the amplitude of the scanner would need to be increased. If the computed ratio is greater than the desired duty cycle, the amplitude of the scanner would need to be decreased. Another algorithm that could be used requires counter 15 to count for N full cycle movements to provide a time interval A and the counter 13 to count for N+M movements between a first fixed point and a second fixed point to provide a time interval B, where N and M are integers such that (BN)/(A(N+M)) is equal to the desired duty cycle. (BN)/(A(N+M)) would then be computed and if less than the desired duty cycle of the scanner, an analog signal would be produced to increase the scanner amplitude with an analog signal produced to decrease the scanner amplitude if (BN)/(A(N+M)) were found to be greater than the desired duty cycle. The algorithm that was initially explained is preferred, however, because it only requires that the counts from counters 13 and 15 be compared which requires less time than the computing required for the other algorithms described. While logic circuitry other than a microprocessor could be used, a microprocessor is considered to be less costly.

The invention presented herein may be embodied in other specific forms without departing from the spirit or essential characteristics thereof. The embodiment that has been described is, therefore, considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. Circuitry for controlling the amplitude of a self-resonant scanner operated to define a scan path including:
    first means for measuring the time interval for the scanner to complete a number of full cycle movements;
    second means for measuring the time interval for the scanner to move a number of times between a first fixed point to a second fixed point in the scan path; and
    logic means connected for receiving the time interval measurements from said first and second means for determining whether such time interval measurements indicate the scanner operating amplitude differs from the desired amplitude and providing digital information based on any such difference that is usable for the production of an analog signal for controlling the amplitude of the scanner to reduce such difference.

2. Circuitry according to claim 1 wherein said first means includes a counter, said second means includes a counter, said first and second means having a clock that is common to each of said first and second means, said clock operatively connects to each of said counters.

3. Circuitry according to claim 1 wherein said logic circuitry is a programmed microprocessor.

4. Circuitry according to claim 1 wherein said logic means notes the time interval A, which is the time interval measured by said first means for N full cycle movements, notes the time interval B, which is the time interval for the scanner to move N+M times between a first fixed point to a second fixed point, where N and M are integers such that N/(N+M) is equal to the desired duty cycle of the scanner, provides digital information for the production of an analog signal for decreasing the amplitude of the scanner if A>B and provides digital information for the production of an analog signal for increasing the amplitude of the scanner if A<B.

5. Circuitry according to claim 1 wherein said logic means notes the time interval A, which is the time interval measured by said first means for N full cycle movements, notes the time interval B, which is the time interval for the scanner to move N+M times between a first fixed point to a second fixed point, where N and M are integers such that N/(N+M) is equal to 1 minus the desired duty cycle of the scanner, provides digital information for the production of an analog signal for increasing the amplitude of the scanner if A>B and provides digital information for the production of an analog signal for decreasing the amplitude of the scanner if A<B.

6. Circuitry according to claim 1 wherein said logic means notes the time interval A, which is the time interval measured by said first means for N full cycle movements, notes the time interval B, which is the time interval for the scanner to move N+M times between a first fixed point to a second fixed point, where N and M are integers such that (BN)/(A(N+M)) is equal to the desired duty cycle of the scanner, provides digital information for the production of an analog signal for decreasing the amplitude of the scanner if (BN)/(A(N+M)) is greater than the desired duty cycle of the scanner, and provides digital information for the production of an analog signal for increasing the amplitude of the scanner if (BN)/(A(N+M)) is less than the desired duty cycle of the scanner.

7. Circuitry according to claim 1 wherein said logic means notes the time interval A, which is the time interval measured by said second means for the scanner to move N times between a first fixed point and a second fixed point, notes the time interval B, which is the time interval measured by said first means for the scanner to move N full cycle movements, where N is an integer, computes A/B, provides digital information for production of an analog signal for increasing the amplitude of the scanner if A/B is less than the desired duty cycle of the scanner and provides digital information for production of an analog signal for decreasing the amplitude of the scanner if A/B is greater than the desired duty cycle of the scanner.

8. Circuitry according to claim 1 further including a digital register connected to said logic circuitry for receiving said digital information, a digital to analog converter connected to said digital register for providing an analog signal in response to the output of said digital register, and a drive circuit for the scanner connected to said digital to analog converter for receiving the analog signal output from said digital to analog converter.

* * * * *

UNITED STATES PATENT AND TRADEMARK OFFICE
CERTIFICATE OF CORRECTION

PATENT NO. : 4,630,223  Page 1 of 3

DATED : December 16, 1986

INVENTOR(S) : David J. Schoon

It is certified that error appears in the above-identified patent and that said Letters Patent is hereby corrected as shown below:

Figures 4 and 5 of the drawings should be added as per attached sheets.

Signed and Sealed this

Twenty-first Day of April, 1987

Attest:

DONALD J. QUIGG

Attesting Officer  Commissioner of Patents and Trademarks

FIG. 4

Fig. 5